: 2,775,042
Patented Dec. 25, 1956

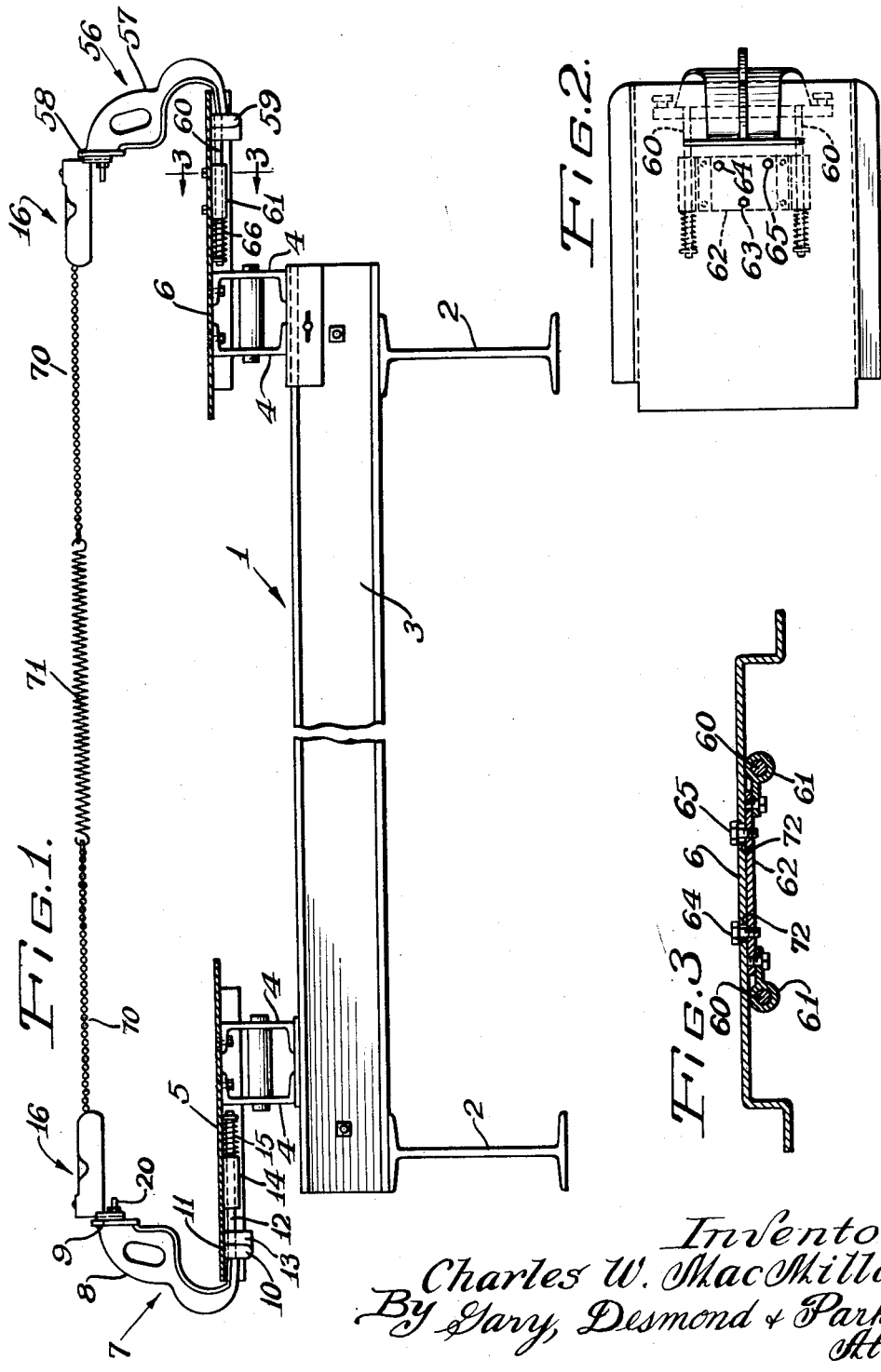

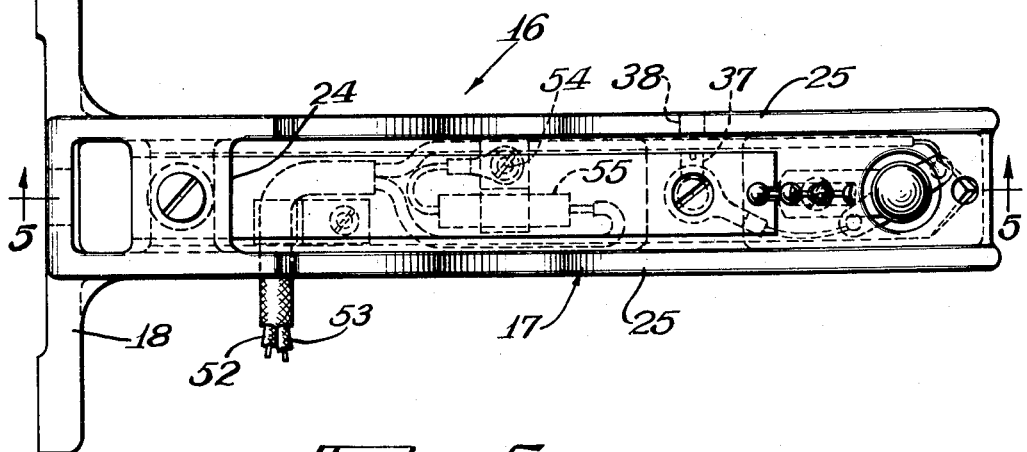
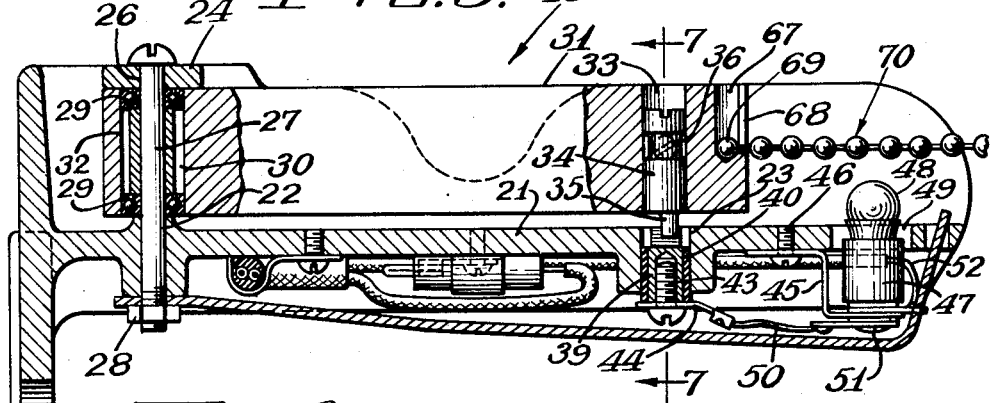
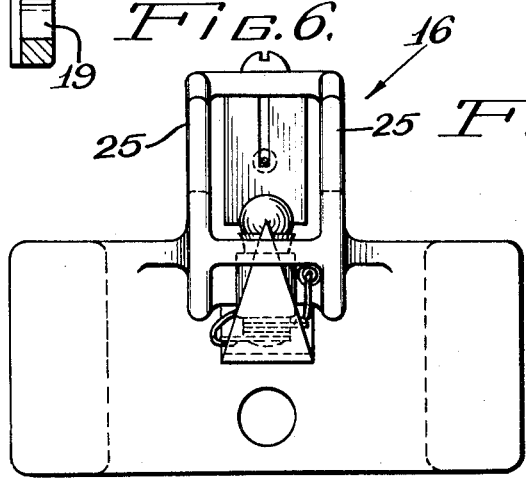
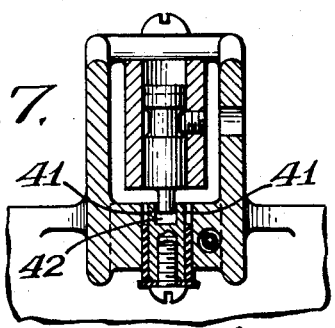

2,775,042
DEVICE FOR ALIGNING PLATES IN PARALLEL

Charles W. MacMillan, Rock Island, Ill., assignor to Bear Manufacturing Company, Rock Island, Ill., a corporation of Delaware Application October 3, 1955, Serial No. 538,088

5 Claims. (Cl. 33—180)

This invention relates to improvements in an aligning mechanism and refers particularly to a device for testing the parallel alignment of two spaced substantially parallel surfaces.

In the alignment of the front wheels of an automobile, one of the factors considered is toe-in of the wheels, commonly referred to as "toe." Toe is that disposition of the front wheels wherein the leading edges of the opposite front wheels are closer together than the trailing edges, that is, wherein the projected planes of the front wheels would intersect at a line in advance of the vehicle.

The measurement of the toe of an automobile is an extremely minute measurement. For example, ½ degree inclination of the plane of the wheel, when the wheels are substantially parallel represents ¼ inch of toe on the standard wheel, and standard specifications are set in terms of 1/32 inch of toe which represents about 1 minute of angular measurement. Consequently, in measuring toe, the datum surfaces from which toe is measured must be accurately disposed in parallelism.

The present invention is directed to a mechanism by which two opposite datum surfaces may be set parallel with a degree of accuracy sufficient to measure toe accurately in accordance with standard specifications.

For a device of the character described to be commercially acceptable three additional factors must be considered. The device must not be too large or bulky so that it may be conveniently handled, stored and shipped; it must be relatively inexpensive, and it must be easily operated by any mechanic in the field.

The device comprising the present invention, in addition to being extremely accurate, meets the three qualifications hereinbefore set forth.

Other features and advantages of the present invention will be apparent from the accompanying drawings and following detailed description.

In the drawings:

Fig. 1 is a front elevational view of the device comprising the concepts of the present invention as applied to a conventional rack.

Fig. 2 is a top plan view of the plate at the right end portion of the rack shown in Fig. 1.

Fig. 3 is an enlarged sectional view taken on line 3—3 of Fig. 1.

Fig. 4 is an enlarged top plan view of one of the measuring devices comprising the present invention.

Fig. 5 is a sectional elevational view taken on line 5—5 of Fig. 4.

Fig. 6 is an end elevational view of the device shown in Fig. 4.

Fig. 7 is a detailed sectional view taken on line 7—7 of Fig. 5.

Referring in detail to the drawings, 1 indicates a portion of a rack for supporting an automotive vehicle while alignment operations are being performed upon the running gear thereof. The portion of the rack 1 shown comprises longitudinal I-beams 2, 2 which support a cross beam 3, also an I-beam. A runway is carried by the beam structure described and comprises opposite pairs of channel irons 4, each channel iron of each pair facing the other channel iron of the pair in flange-to-flange relationship.

A plate 5 is secured to the upper surface of one pair of channels 4 and a similar plate 6 is similarly secured to the upper surface of the opposite pair of channels, said plates being preferably bolted to the respective pairs of channel irons. The plates 5 and 6 are carried at the forward ends of the runway and are adapted to support the front wheels of an automotive vehicle (not shown).

A conventional toe slide 7 is carried by plate 5. The toe slide comprises a curved member 8 which terminates at its outer end portion in a plate 9 having an outer datum surface of relatively large area. In the normal operation of the toe measuring device the datum surface of plate 9 makes contact with the face of a toe-measuring gauge (not shown) which is mounted on the vehicle being tested, that is, the wheel of the vehicle assumes a plane-parallel relationship to plate 9. The lower portion of the toe slide is pivotally connected, as at 10 in Fig. 1, to a block 11 which carries a pair of spaced guide rods 12 (only one of which is shown). The guide rods 12 are slidably positioned in guide block 13 and each rod is slidably positioned in a sleeve 14. A coil spring 15 embraces each rod 12 and normally urges said rods inwardly with respect to plate 5.

In operation, the structure described is so oriented that the toe slide may be moved rectilinearly outwardly away from plate 5 or may be rocked about the pivotal connection 10. However, when the device is in its normal position the plane of the datum surface of plate 9 will be parallel to the axis of the runway and at right-angles to plate 5. The toe slide 7 is stationary with regard to rotation of plate 9 in so far as rotation in a horizontal plane is concerned and will hereinafter be referred to as the "fixed toe slide" although it is not fixed in an absolute sense.

The function of the device comprising the present invention is to locate and dispose the surface of a second plate, similar to plate 9, in spaced parallel relationship to the datum surface of plate 9. The device for accomplishing this operation comprises essentially two indicating members 16. In view of the fact that both indicating members employed are identical, only one of said members will be described in detail.

Referring in detail to Figs. 4, 5 6 and 7, one of the indicator members 16 is illustrated in detail. Each indicator 16 comprises a beam portion 17 which is substantially H-shaped in cross-section, said beam portion terminating at one end in a transverse abutment portion 18. The axis of the beam portion 17 is at right-angles to the plane of the abutment portion 18 and said latter portion is provided with a recess 19 whereby the portion 18 may be secured to the plate 9 of the toe slide 7 by means of screw 20. Thus, the beam portion extends at right-angles to the datum surface of plate 9.

The beam portion 17 comprises a web 21 which is provided with spaced apertures 22 and 23, said apertures having their axes on the longitudinal axis of the beam portion, that is, a line projected through the centers of the apertures 22 and 23 intersects the datum surface of plate 9, when the indicator is mounted on said plate, at right-angles. A bridging web 24 extends transversely across the side portions 25 of the H-sectioned beam 17 adjacent aperture 22, and said bridging web is provided with an aperture 26 which is in axial vertical alignment with aperture 22. A bolt 27 is positioned in aperture 22 and 26 and is rigidly secured to the beam 17 by nut 28.

A pair of ball bearing assemblies 29 circumscribes the bolt 27 and are spaced from each other by a spacer tube 30 which bears upon the inner races of the bearings 29. A swinging indicator beam 31 carries the bearings 29, the outer races thereof being secured in an aperture 32 provided in one end portion of said indicator beam. The arrangement is such that the indicator beam 31 can swing freely about bolt 27, as an axis, the swingable movement of the indicator beam being facilitated by the bearings 29.

The opposite end portion of the indicator beam 31 is provided with an aperture 33 which is adapted to receive frictionally a metallic plug 34. A pin 35 extends from the lower end of the plug 34, said pin being eccentric with respect to the axis of the plug. The plug 34 is provided with an annular groove 36 and a set screw 37 is adapted to be threadedly inserted through the side portion of the beam 31, the inner end of said set screw being adapted to engage in groove 36 whereby the plug may be fixedly positioned within the aperture 31 with the pin 35 in a predetermined position. Side portion 25 of the beam 17 is provided with an aperture 38 whereby access may be had to set screw 37.

A metallic plug 39 is positioned in aperture 23 provided in web 21, said plug being insulated from the walls of the aperture by means of insulating collar 40, the collar and plug 39 being frictionally engaged in the aperture 23. A pair of spaced ears 41 extend upwardly from the metallic plug 39, the ears define a groove 42 which extends lengthwise with respect to the length of the beam 17.

When the device is in operative, adjusted position, the eccentric pin 35 is positioned in the groove 42 and when the axis of the indicator beam 31 is disposed parallel to the axis of the beam 17, the pin 35 is positioned intermediate the width of the groove 42, that is, the sides of the pin are spaced from the inner surfaces of the ears 41. The purpose of this arrangement will be hereinafter more fully described. A screw 43 is threadedly engaged in the lower portion of the metallic plug 39, said screw functioning as a binding post for an electrical connector 44. A bracket 45 is secured to the lower portion of the web 21 by means of screw 46, said bracket functioning to support socket 47 which in turn is adapted to receive an electric lamp 48. Web 21 is provided with an aperture 49 in which the socket and lamp is positioned whereby the lamp, when illuminated, can be observed from above the web 21.

Connector 44 is secured to conductor 50 which in turn connects with base 51 of socket 47. The wall of socket 47 is connected to conductor 52 which may be connected to a source of electrical current (not shown). A conductor 53 also connected to said source of electrical current is grounded upon web 17 by means of screw 54, a resistance 55 being interposed in conductor 53 whereby the usual service current, to which conductors 52 and 53 are externally connected may have its voltage reduced.

The arrangement is such that eccentric pin 35 comprises the grounded portion of the electrical circuit and the ears 41 comprise the ungrounded portion of the circuit. It can readily be seen that when the pin 35 is positioned in groove 42 in such manner as to be spaced from ears 41, the circuit to the lamp 48 is open. When, however, the beam 31 is rocked about bolt 27, pin 35 makes contact with one or the other of the ears 41 and hence the electrical circuit to lamp 48 is completed and the lamp is illuminated.

On the opposite side of rack 1 and secured to plate 6 a toe slide 52 similar to toe slide 7 is mounted. The toe slide 56 comprises a curved member 57 similar to member 8 which terminates in a plate 58 similar to plate 9. The lower portion of member 57 is pivotally mounted, as at 59 and carries a pair of spaced guide rods 60. The assembly comprising toe slide 56 differs from the assembly of toe slide 7 in that spaced sleeves 61 through which guide rods 60 are slidably positioned, are carried by subplate 62 which latter is adapted to be secured to the lower face of plate 6 by means of three screws 63, 64 and 65. Coil springs 66 embrace the end portions of guide rods 60 and normally urge toe slide 56 inwardly with respect to plate 6.

In employing the present invention, an indicator unit 16 is mounted upon plate 9 of toe slide 7, as hereinbefore described. An indicator unit is similarly mounted upon toe slide 56. Each indicator beam 31 is provided with an aperture 67 having a slot 68 which opens to an end of the beam 31. An end bead 69 of a flexible bead chain 70 is engaged in the aperture 67 of each beam 31 and a coil tension spring 71 connects each of the opposite chains together, as shown best in Fig. 1. Thus, each of the indicator beams 31 of the opposite indicator units tends to assume a straight line in alignment with each other and in alignment with the tensional force tending to pull them toward each other.

By the construction of the indicator device, hole 23 is in alignment with bolt 27, and a plane including their axes intersects the datum surfaces of plates 9 and 56 at right-angles, and that a plane passed through the axis of pin 35 and bolt 27 would intersect plates 9 and 56 at right-angles to the datum surfaces of said plates when said datum surfaces are parallel to each other. In other words, when the datum surfaces are parallel to each other pin 35 will be midway between and out-of-contact with, the ears 41. (It will be recalled that plug 39 is initially adjusted so that the slot 42 is in longitudinal alignment with the axis of the beam 17.) Hence, when the datum surfaces of the plates 9 and 58 are parallel to each other, the lamp 48 will not be illuminated.

If, however, the datum surfaces of plates 9 and 58 are not parallel the pins 35 of the indicator beams will contact an ear 41 of each respective plug 39 and the lamps of both units will be illuminated. An operator can thereby quickly observe that the datum surface of plate 58 is not parallel to the datum surface of plate 9.

As has been hereinbefore described, by construction, toe slide 7 is considered as the fixed toe slide. Hence, the task of the operator is to dispose the datum surface of plate 58 parallel to the datum surface of plate 9. It will be noted that toe slide 56 is secured to plate 6 by the three screws 63, 64 and 65 which engage in subplate 62. It will also be noted that the apertures in plate 6, shown best at 72 in Fig. 3, are greater in diameter than the diameters of the shanks of the screws 63, 64 and 65. Hence, to reorient subplate 62 with respect to plate 6, screws 64 and 65 are loosened and screw 63 is maintained tightened to a degree whereby the subplate 62 may be moved relative to plate 6 only by the exertion of a substantial effort. The subplate 62 may then be swung about screw 63. This movement swings plate 58 about a vertical axis whereby the datum surface of plate 58 may be swung into parallelism with the datum surface of plate 9. The swinging adjustment can be carried out by the operator while he observes the lamps 48. When both lamps are extinguished the respective datum surfaces are parallel.

The operator may then fasten screws 64 and 65; the indicators 16 may be removed from both plates 9 and 58, and the toe slides are then in condition to measure the toe of the automobile wheels to the degree of accuracy required.

I claim as my invention:

1. A device for indicating the parallelism of opposed datum surfaces of two oppositely spaced plates which comprises, a pair of indicators, means for securing an indicator to each plate, each indicator comprising a set of members comprising a beam member, a pivot carried by each beam member, and a swingable arm member carried by said pivot whereby each swingable arm member is swingably mounted upon a beam member of its set, a pair of spaced electrically conductive contact elements carried by one of the members of each set, the mid portion between said contact elements being in a common plane with the axis of an adjacent pivot which plane extends at right-angles to an adjacent datum surface, an electrically conductive pin carried by the other member of each set and adapted to be disposed between the contact elements carried by the adjacent member of the set, flexible resilient means connecting the opposite swingable arm members of each set together, an electrical signal carried by one member of each set, and electrical connecting means connecting said contact elements, said electrical signal, and said pin of each set in series with a source of electrical current.

2. A device for indicating the parallelism of opposed datum surfaces of two oppositely spaced plates which comprises, a pair of indicators, means for securing an indicator to each plate, each indicator comprising a set of members comprising a beam member, a pivot carried by each beam member, and a swingable arm member carried by said pivot whereby each swingable arm member is swingably mounted upon a beam member of its set, a pair of spaced electrically conductive contact elements carried by one of the members of each set, the mid portion between said contact elements being in a common plane with the axis of an adjacent pivot which plane extends at right-angles to an adjacent datum surface, an electrically conductive pin carried by the other member of each set, means for laterally moving said pin relative to said last-mentioned member to dispose said pin midway between the contact elements carried by the adjacent member of the set, flexible resilient means connecting the adjacent end portions of the opposite swingable arm members of each set together, an electrical signal carried by one member of each set, and electrical connecting means connecting said contact elements, said electrical signal, and said pin of each set in series with a source of electrical current.

3. A device for indicating the parallelism of opposed datum surfaces of two oppositely spaced plates which comprises, a pair of indicators, means for securing an indicator to each plate, each indicator comprising a set of members comprising a beam member, a pivot carried by each beam member, and a swingable arm member carried by said pivot whereby each swingable arm member is swingably mounted upon a beam member of its set, a pair of spaced electrically conductive contact elements carried by the beam member of each set, the mid portion carried between said contact elements being in a common plane with the axis of an adjacent pivot which plane extends at right-angles to an adjacent datum surface, an electrically conductive pin carried by the swingable arm member of each set and adapted to be disposed between the contact elements carried by the adjacent beam member of the set, flexible resilient means connecting the opposite swingable arm members of each set together, an electrical signal carried by one member of each set, and electrical connecting means connecting said contact elements, said electrical signal, and said pin of each set in series with a source of electrical current.

4. A device for indicating the parallelism of opposed datum surfaces of two oppositely spaced plates which comprises, a pair of indicators, means for securing an indicator to each plate, each indicator comprising a set of members comprising a beam member, a pivot carried by each beam member, and a swingable arm member carried by said pivot whereby each swingable arm is swingably mounted upon a beam member of its set, a pair of spaced electrically conductive contact elements carried by each of the beam members of each set, the mid portion between said contact elements being in a common plane with the axis of an adjacent pivot which plane extends at right-angles to an adjacent datum surface, an electrically conductive pin carried by the swingable arm member of each set and adapted to be disposed between the contact elements carried by the adjacent member of the set, flexible resilient means connecting the opposite swingable arm members of each set together, said pin being positioned between an adjacent pivot and the connection of the flexible, resilient means to said arm member, an electrical signal carried by one member of each set, and electrical connecting means connecting said contact elements, said electrical signal, and said pin of each set in series with a source of electrical current.

5. An indicator unit for a device for indicating the parallelism of opposed datum surfaces of two oppositely spaced plates which comprises, a set of members adapted to be mounted on said plate comprising a beam member, a pivot carried by said beam member, and a swingable arm carried by said pivot whereby said swingable arm is swingably mounted upon said beam member, a pair of spaced electrically conductive contact elements carried by one of said members, the mid portion between said contact elements being in a common plane with the axis of the pivot which plane is at right-angles to said datum surface of the plate upon which the unit is mounted, an electrically conductive pin carried by the other member of the set and adapted to be disposed between said contact elements, an electric signal carried by one of said members, and electrical connecting means connecting said contact elements, said electrical signal, and said pin in series with a source of electrical current.

No references cited.